J. D. RHODES.
CAR DRAW-BARS.

No. 174,574.   Patented March 7, 1876.

Witnesses.
G. T. Parker
John Price

Inventor
Julius D. Rhodes,
Burridge & Co
Attys.

UNITED STATES PATENT OFFICE.

JULIUS DEXTER RHODES, OF CLEVELAND, OHIO.

IMPROVEMENT IN CAR DRAW-BARS.

Specification forming part of Letters Patent No. 174,574, dated March 7, 1876; application filed January 12, 1876.

*To all whom it may concern:*

Be it known that I, JULIUS DEXTER RHODES, of Cleveland, in the county of Cuyahoga and State of Ohio, have invented a certain new and Improved Railway-Car Draw-Bar; and I do hereby declare that the following is a full, clear, and complete description thereof, reference being had to the accompanying drawings, making a part of the same.

Figure 1:
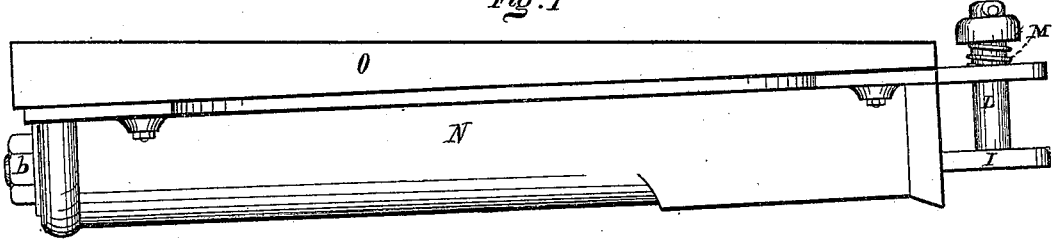
Figure 2:
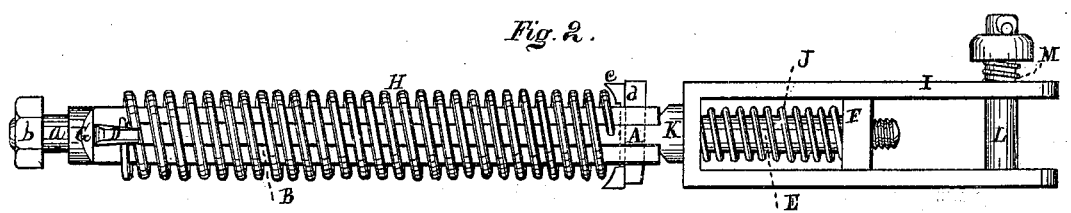
Figure 3:
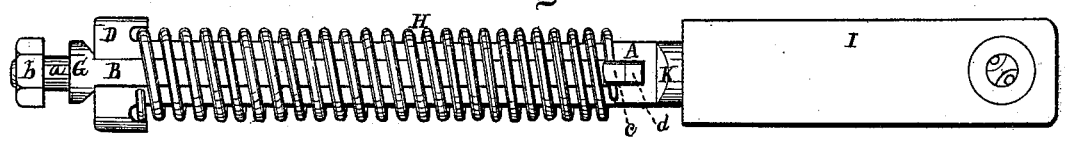
Figure 4:
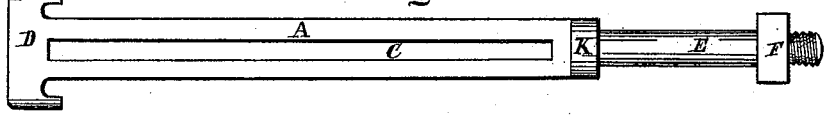
Figure 5:
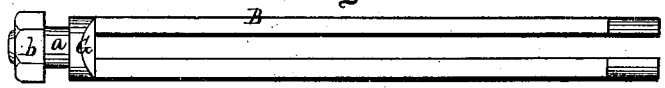
Figure 6:
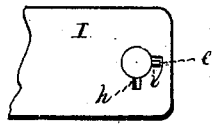

Figure 1 is a side view of the draw-bar. Fig. 2 is a side view of the draw-bar, with the casing removed. Fig. 3 is a plan view of Figs. 1 and 2. Figs. 4, 5, and 6 are detached sections.

Like letters of reference refer to like parts in the several views.

This invention is a draw-bar for street-railway cars, &c., the object of which is to ease the strain upon the horses' shoulders on first starting the car, and also to prevent sudden impulsive movements of the car, thereby preventing the passengers from being jostled and thrown down while entering or while standing therein.

The construction of the draw-bar and operation of the same are as follows: A and B, in Figs. 4 and 5, represent two sliding links. The link A is provided with a longitudinal opening or slot, C, and terminates in a check, D, at one end, and a stem, E, at the other. On the extreme end of the stem is fitted a nut, F. As will be seen at Fig. 5, the link B consists of two parallel arms, open at one end and connected at the other by a shoulder, G, from which proceeds a screw, a, provided with a nut, b. The two links are locked into each other, as shown in Figs. 2 and 3, in which it will be seen that the link A is inserted in the bifurcated link B, the open end of the link being retained in place by a gib and key, c d. Around the two links thus united is wound a spring, H, closely fitting to the links, but sufficiently loose to permit their sliding one in the other. Said springs, it will be observed, is confined in its connection with the links by the check D at one end, and by the gib and key at the other, as will be seen in the Figs. 2 and 3. The stem or shank E, referred to, is inserted in the end of the head I, and is secured therein by the nut F, between which and the end of the head is wound around the stem a spring, J, the purpose of which will presently be shown. Said spring draws the shoulder K of the link close to the end of the head, thereby keeping the links in direct line with the head, and they are prevented from turning by the nut F, which, as will be seen, fits closely in the arms of the head, and therefore can neither turn nor allow the links to turn in its relation therewith. L is a king-bolt for holding the double-tree or other draft-gear in the jaws of the head. Said bolt is retained in place by a nib, e, Fig. 6, projecting from the side of the lower end thereof. A notch, h, is cut in the side of the bolt-holes for the passage of the nib, which, when the bolt is inserted in the hole, is then turned partially around, bringing the nib away from the notch, and causing it to slip into an inclined recess, i, cut in the lower side of the head near the bolt-hole, as will be seen in Fig. 6. Said nib is drawn into the recess by the spring M, Figs. 1 and 2, the tension of which forces upward the bolt, thereby drawing the nib in the recess, thus securing the bolt in the head, so that it cannot jar out. N, Fig. 1, is a case inclosing the draw-bar, whereby it is protected from injury, dirt, &c., and to which the draw-bar is secured by a nut, b, and whereby the car is drawn, having the same attached thereto. Said case is attached to a plate, O, the rear end of which is much thicker than the front end, as will be seen in the drawing, the reason for which will hereinafter be explained.

The practical operation of the above-described draw-bar is as follows: The draw-bar, as shown in Fig. 1, is, by any appropriate means, secured to the under side of the platform of a car, with the end of the head and the bolt L projecting therefrom, as shown in said Fig. 1. The team is attached thereto by the double-tree or other device secured in the head by the king-bolt L, whereby the car is drawn.

It is well known that the initial power required to move a car at rest is very severe on the shoulders of the horses; and more especially is this the case when the car is full of persons. This dead weight to be moved by the team, when they are suddenly started, brings the full force of the strain like a blow upon the shoulders of the team, to avoid which is the purpose of the spring H, the tension of which is such that it will yield only under such force as is required to move the car when thus loaded and first started, or under more than the ordinary power required to continue the motion of the car when under way.

It will be obvious that the draft of the team when thus suddenly exerted for starting the car will be thrown upon the draw-bar, which, by virtue of the sliding link A drawing outward, will relieve the team from the sudden jerk of their initial efforts to move the car, but which will be expended upon the springs, relieving the shoulders of the team from sudden and severe strain, as aforesaid.

In the event the car is empty, or having but a few persons therein, or in passing over a street-crossing, under which, and other similar circumstances, there is exerted no extraordinary power to move the car, the spring J will be sufficient to relieve the team from the slight and sudden strain that may result from their efforts and from the pitching movement of the car in passing over said street-crossing, or its partial stopping to take on or let off passengers.

Under all circumstances on starting the car, whether loaded or not, the team will not experience the sudden resistance of starting into motion a dead weight, the inertia of which must be overcome by the first pull of the team, for the instant the team begins to pull the springs will begin to yield to the initial force exerted; hence the car begins to move gently, without violence and a sudden impulsive start.

The application of the draw-bar to street-railway cars renders the riding in them much easier, as the movement of the cars is unattended by jolts and sudden and unexpected movements. The draw-bar may also be applied to steam trains of cars, and to similar and various uses requiring the tensional assistance of a spring or springs, arranged in combination with the links, as above described.

The purpose of the wedge-shape plate O is to bring the position of the draw-bar in line with the draft of the tugs, which, from the draw-bar, are inclined upward to the shoulders of the team.

What I claim as my invention, and desire to secure by Letters Patent, is—

1. The sliding link A, check D, and stem E, in combination with the bifurcated link B, gib and key c d, in the manner as described, and for the purpose set forth.

2. In combination with the sliding link A, bifurcated link B, check D, stem E, and gib and key c d, the spring H, in the manner substantially as described, and for the purpose specified.

3. In combination with the sliding link A, bifurcated link B, and spring H, the head I, spring J, nut F, and case N, substantially in the manner as described, and for the purpose set forth.

4. The king-bolt L and spring M, constructed as described, with projecting nib e, in combination with the head I, the bolt-hole provided with a notch, h, and recess i, substantially as described, and for the purpose set forth.

JULIUS DEXTER RHODES.

Witnesses:
W. H. BURRIDGE,
JAMES KNOWLES.